United States Patent [19]

Campbell

[11] Patent Number: 4,854,384
[45] Date of Patent: Aug. 8, 1989

[54] PIPELINE PACKER

[75] Inventor: Douglas C. Campbell, Edmonton, Canada

[73] Assignee: Dawasue Industries Limited, Alberta, Canada

[21] Appl. No.: 115,866

[22] Filed: Nov. 2, 1987

[30] Foreign Application Priority Data

Apr. 7, 1987 [CA] Canada ................. 534015

[51] Int. Cl.$^4$ .................. E21B 23/06; E21B 33/129
[52] U.S. Cl. ..................... 166/122; 166/134; 166/135; 166/187; 166/192; 188/271; 285/397
[58] Field of Search ............... 166/64, 120, 122, 134, 166/135, 153, 187, 192, 196; 175/423; 285/382.2, 382.4, 382.7, 397, 422; 188/251 M, 271; 138/89, 90, 93, 97; 73/40.5 R

[56] References Cited

U.S. PATENT DOCUMENTS

| | | | |
|---|---|---|---|
| 1,400,701 | 12/1921 | Vreeland | 175/423 |
| 1,662,429 | 3/1928 | Lowy | 250/303 |
| 2,545,102 | 3/1951 | Miller | 73/40.5 |
| 2,924,966 | 2/1960 | En Dean et al. | 73/40.5 |
| 2,959,226 | 11/1960 | Blood | 166/187 X |
| 3,011,555 | 12/1961 | Clark, Jr. | 166/134 X |
| 3,107,696 | 10/1963 | Ver Nooy | 138/89 |
| 3,162,505 | 12/1964 | Hall | 73/40.5 X |
| 3,196,686 | 7/1965 | Cole | 73/40.5 X |
| 3,381,714 | 5/1968 | Johnson | 73/40.5 X |
| 3,483,734 | 12/1969 | Wood | 73/40.5 |
| 3,483,895 | 12/1969 | Barto | 138/93 X |
| 3,593,749 | 7/1971 | Reardon | 138/93 |
| 3,675,949 | 7/1972 | Dawson | 285/382.2 |
| 3,837,214 | 9/1974 | Guest | 73/40.5 |
| 3,886,977 | 6/1975 | Dorgebray | 138/89 |
| 3,943,982 | 3/1976 | Lecordier | 138/89 |
| 4,026,329 | 5/1977 | Thompson | 138/97 |
| 4,083,230 | 4/1978 | Rome, Sr. et al. | 73/40.5 |
| 4,141,413 | 2/1979 | Morris et al. | 166/120 |
| 4,272,984 | 6/1981 | Bell | 73/40.5 |
| 4,296,806 | 10/1981 | Taylor et al. | 166/120 |
| 4,305,277 | 12/1981 | Ball et al. | 73/40.5 |
| 4,332,277 | 6/1982 | Adkins et al. | 138/89 |
| 4,352,394 | 10/1982 | Zehren | 166/120 X |
| 4,381,800 | 5/1983 | Leslie | 138/90 |
| 4,422,477 | 12/1983 | Wittman et al. | 138/89 |
| 4,423,754 | 1/1984 | Carter, Jr. | 138/93 |
| 4,465,104 | 8/1984 | Wittman et al. | 138/89 |
| 4,611,658 | 9/1986 | Salerni et al. | 166/120 X |

FOREIGN PATENT DOCUMENTS

| | | |
|---|---|---|
| 526582 | 6/1956 | Canada . |
| 627903 | 9/1961 | Canada . |
| 904772 | 7/1972 | Canada . |
| 923052 | 3/1973 | Canada . |
| 951934 | 7/1974 | Canada . |
| 969491 | 6/1975 | Canada . |
| 1108526 | 9/1981 | Canada . |
| 1132454 | 9/1982 | Canada . |
| 1137870 | 12/1982 | Canada . |
| 1167761 | 5/1984 | Canada . |
| 1284197 | 11/1968 | Fed. Rep. of Germany ... 188/251 M |
| 2144427 | 3/1972 | Fed. Rep. of Germany ... 188/251 M |

Primary Examiner—Bruce M. Kisliuk
Attorney, Agent, or Firm—Oliff & Berridge

[57] ABSTRACT

The pipeline packer described herein typically includes a main body adapted for propulsion through the pipeline in an axial direction. A brake shoe support assembly is located on the main body and a plurality of circumferentially spaced brake shoes capable of gripping the interior wall of the pipeline are mounted to the support assembly. Fluid pressure activated means are associated with the brake shoe support assembly for urging the brake shoes radially outwardly into gripping engagement with the pipeline to secure the main body in a desired location in the pipeline against the pipeline pressure forces acting thereon. A pair of annular wedging means are also mounted to the main body for axial movement toward each other as the fluid pressure activated means acts on the brake shoe support assembly to urge the brake shoe into gripping engagement. An annular sealing member of elastomeric material is located between the annular wedging means and is adapted to co-operate with same so as to expand radially outwardly as the annular wedging members move toward each other. The packer also includes fluid pressure supply and control means connected to the fluid pressure activated means so that on demand the brake shoes urged into gripping relationship with the pipeline while at the same time the annular sealing member is expanded into sealing engagement with the pipeline wall.

23 Claims, 6 Drawing Sheets

PIPELINE PACKER

BACKGROUND OF THE INVENTION

This invention relates to a pipeline plug or packer for plugging a pipeline, such as a crude oil pipeline, at a selected location therealong.

Pipeline packers of the type to which the present invention relates are designed to act as positionable shut-off valves inside a pipeline. The packer is typically loaded into the pipeline through a standard pig trap and the packer is transported along the pipeline by the fluid flowing in the line. Tracking of the packer is typically done from above ground with a sensor receiving signal from a transmitter located on the packer. When the packer reaches the desired position, the pipeline pumping equipment is stopped to stop the flow and the packer is activated by remote control so as to seal the pipeline at that location. With two packers spaced some distance apart, it is possible to isolate a section of the pipeline, thereby allowing that section of the pipeline to be drained to provide a substantially liquid-free environment without draining the entire line. After the desired work in the pipeline has been accomplished, the packer is released by remote control, and the flow through the pipeline is started up to move the packer along the line with the packer being thereafter removed through a further pig trap.

The pipeline packer must be capable of forming a reliable seal under a wide variety of conditions. In mountainous country, extremely high pipeline hydrostatic heads are common, typically being in the order of several hundred pounds per square inch and, in extreme cases, pressure heads as high as 1000 pounds per square inch may be encountered.

The prior art devices typically fall into two main categories. The first category of packer employs one or more inflatable annular cuffs which are expanded outwardly into contact with the pipeline interior wall in an effort to resist the pressures developed during use. Packers employing inflatable cuffs are not effective in providing a seal at high pressures as the cuff material is incapable of tightly gripping the pipeline interior wall (which wall may have an accumulation of waxy material or other deposits thereon reducing the co-efficient of friction obtainable) with the result being that packers of this nature tend to be moved fairly quickly out of their intended positions. The other category of packer typically employs a plurality of wedge-shaped shoes or slips which may be activated by hydraulic pressure to bring such shoes into gripping engagement with the pipeline interior wall. Auxiliary sealing means for engaging the pipeline interior wall are also provided to prevent leakage of fluid. Again, difficulties have been encountered with these arrangements owing to the fact that the gripping shoes tend to bite into and damage the pipeline interior wall. This damage opens the way for rapid corrosion owing to the presence of sulphur compounds in the crude oil being pumped. In addition, the roughening of the pipeline interior wall is strongly objected to by most pipeline companies since this roughness tends to damage the annular seals or rubbers which are used in conjunction with pipeline cleaning pigs and the like which are caused to travel along the pipeline interior at regular intervals. Reliability of the prior art devices has also been a factor with certain of the wedge or slip type arrangements having been known to jam in the gripping and sealing position thus giving rise to serious difficulties. Many of the prior art devices were also rather bulky and cumbersome, many requiring external sources of electrical and hydraulic power thus necessitating the use of extremely long lengths of hydraulic lines and electrical conduits.

SUMMARY OF THE INVENTION

It is accordingly a basic object of the present invention to provide an improved pipeline packer capable of alleviating the problems noted above, which packer is capable of gripping and sealing against a pipeline interior wall in a reliable manner under extremely high pressures and which at the same time is so constructed as to avoid damage to the pipeline wall.

It is a further general object of the invention to provide an improved pipeline packer which is compact, reliable, and self-contained, incorporating its own sources of electrical and hydraulic energy.

Further features and advantages of the invention will become apparent from the following description.

A pipeline packer constructed in accordance with the present invention typically includes a main body adapted for propulsion through the pipeline in an axial direction. A brake shoe support assembly is located on the main body and a plurality of circumferentially spaced brake shoes capable of gripping the interior wall of the pipeline are mounted to the support assembly. Fluid pressure activated means are associated with the brake shoe support assembly for urging the brake shoes radially outwardly into gripping engagement with the pipeline to secure the main body in a desired location in the pipeline against the pipeline pressure forces acting thereon. A pair of annular wedging means are also mounted to the main body for axial movement toward each other as the fluid pressure activated means acts on the brake shoe support assembly to urge the brake shoes into gripping engagement. An annular sealing member of elastomeric material is located between the annular wedging means and is adapted to co-operate with same so as to expand radially outwardly as the annular wedging members move toward each other. The packer also includes fluid pressure supply and control means connected to the fluid pressure activated means so that on command the brake shoes are urged into gripping relationship with the pipeline while at the same time the annular sealing member is expanded into sealing engagement with the pipeline wall.

Typically, the main body of the packer includes separate portions which are relatively axially movable in response to the activation of the fluid pressure means. Both the annular wedging means and the brake shoe support assembly are mounted on the main body portions for relative axial movement with respect to each other.

Preferably, the brake shoe support assembly includes relatively movable annular parts which define opposed annular wedging surfaces, which wedging surfaces engage with the brake shoes to effect radial movement of same in response to the relative axial movement.

The annular wedging means and the brake shoe support assembly together preferably comprise a pair of end rings and an intermediate ring. The end rings are typically secured to the respective separate portions of the main body while the intermediate ring may be mounted for free axial movement along the main body. The annular wedging means are preferably defined on the first one of the end rings as well as on a portion of the intermediate ring while the annular wedging surfaces are defined on a further portion of the intermediate ring and on the second end ring. Hence, as these rings move axially toward or away from one another, both the annular sealing member and the brake shoes move radially outwardly or inwardly respectively.

It has been found desirable for the annular sealing member to be located on the upstream high pressure side of the brake shoes with the structure being arranged such that the annular sealing member is in relatively close proximity to the brake shoes when in the sealing and gripping positions respectively. In this way the brake shoes can assist in supporting the annular sealing member against the fluid pressure as the brake shoes come into proximity with the interior wall of the pipeline. In other words, the wedging surfaces have plural slopes thereon such that during the first portion of the relative movement of the wedging surfaces toward each other, the brake shoes are moved radially outwardly by a selected distance while during a second equal portion of such relative movement, the brake shoes are moved radially outwardly into engagement with the pipeline interior wall by substantially less than said selected distance. The arrangement is such as to provide a desired mechanical wedging advantage as the shoes come into gripping engagement with the pipeline wall while at the same time minimizing the overall amount of relative motion required between the wedging surfaces to provide the total amount of radial motion of the brake shoes. This, among other things, helps to conserve space by reducing the amount of relative axial travel between the cooperating parts.

As a further aspect of the invention, the brake shoes each comprise a rigid metal backing and a metal facing fixed thereto for engaging the pipeline interior wall. The rigid metal backing avoids bending or deflection under the high forces encountered while the metal facing is sufficiently soft or malleable as to allow a substantial pressure to be exerted between the brake shoes and the pipeline interior wall without causing scoring of the pipeline wall. The metal facing typically comprises a non-ferrous metal or alloy such as aluminum. This facing, being softer than the pipeline wall material, does not create any scoring, and, moreover, should the packer be, stopped adjacent a welded area, the soft malleable metal can mold itself around the weld while still ensuring a good secure grip. The metal facing may be provided with narrow ribs to assist in providing relatively high contact pressures.

BRIEF DESCRIPTION OF THE DRAWINGS

In drawings which illustrate a preferred embodiment of the invention.

DETAILED DESCRIPTION OF THE PREFERRED EMBODIMENT

Figure 1:
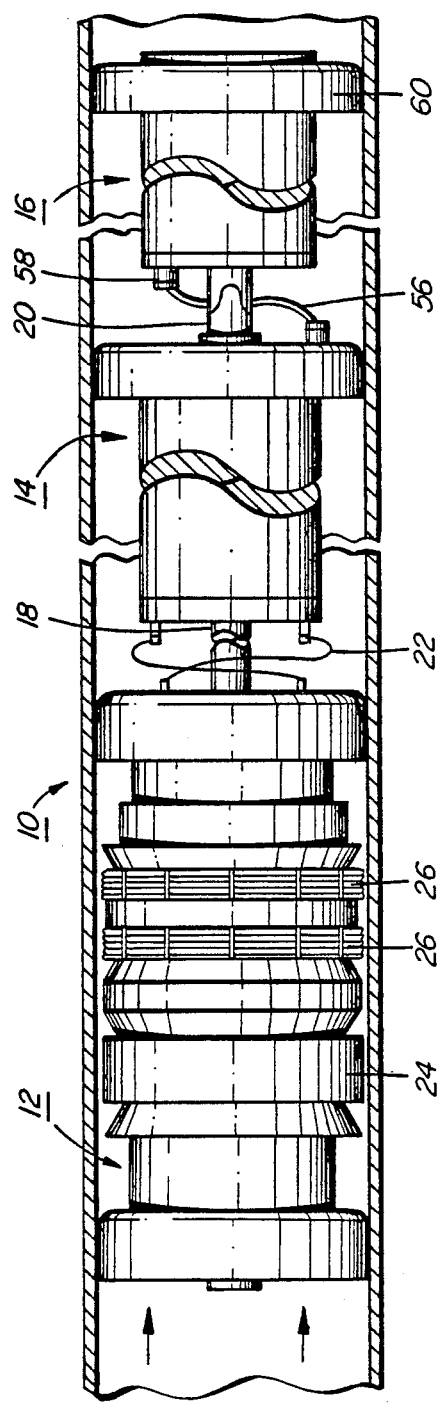
FIG. 1 is a side elevation view of a packer in accordance with the present invention positioned within a pipeline.

Referring firstly to FIG. 1, the pipeline packer 10 is illustrated as being disposed within a pipeline, the pipeline packer 10 comprising three main modules 12, 14 and 16. Module 12 is the gripping and sealing module and it contains a mechanism to effect gripping and sealing of the packer in the pipeline. Hydraulic lines 22 between hydraulic power module 14 and the gripping and sealing module 12 are formed as spirals thereby to allow flexing movement without overstressing the hydraulic lines.

The gripping and sealing module 12 will be described in detail hereinafter but by way of a general introduction to it is noted here that sealing of the pipeline is accomplished by a polyurethane sealing ring which is radially expanded by virtue of annular wedge rings to be described hereafter. A gripping action is effected by means of a plurality of circumferentially arranged brake shoes 26 which are expanded radially outwardly against the interior wall of the pipeline by means of annular wedge rings to be described hereinafter. Several wedge rings are forced to move in the axial direction by means of a double acting hydraulic piston and cylinder arrangement located within the body of module 12 and arranged such that the reservoir for the hydraulic system is incorporated in the low pressure end of the cylinder thereby conserving space. The gripping and sealing module 12 will be described in full detail hereafter.

Figure 3:
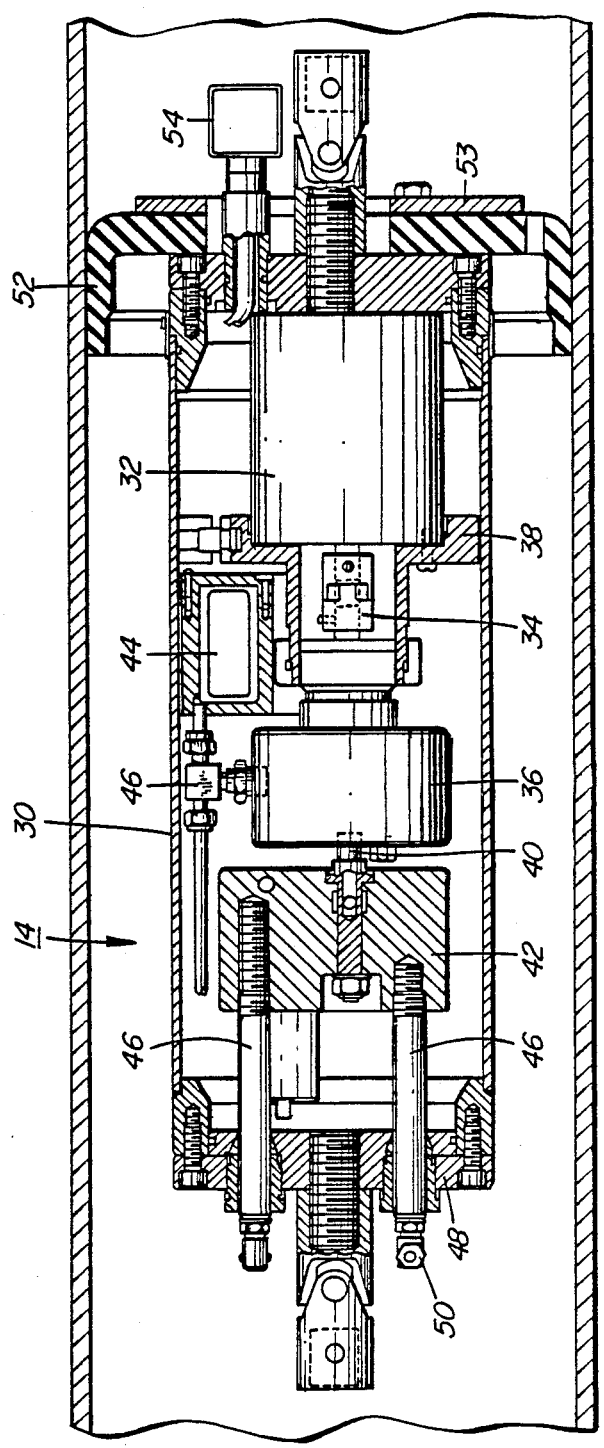
FIG. 3 is a longitudinal section view of the hydraulic power module portion of the packer.

With reference to FIG. 3, the body of the hydraulic power module comprises a sealed cylinder 30 which contains, adjacent the frontal end thereof, an electric drive motor 32, the output shaft of which is connected via a shaft coupler 34 to the input shaft of a hydraulic pump 36. This pump is a high-pressure hydraulic piston pump such as a Racine Pump Model 055. The drive motor 32 is preferably such that it can be powered by a 24 volt direct current. A suitable clamp arrangement 38 supports both the drive motor 32 and the hydraulic pump 36.

Connected to the outlet 40 of the pump 36 is a manifold 42 which contains a check valve, a relief valve, a solenoid valve and a pressure switch, all of which will be described in further detail hereafter. An accumulator 44 connected to the pump inlet 46 compensates for changes of fluid volume due to temperature changes, compression effects and leakage. The accumulator is preferably crescent-shaped so as to accommodate itself to the cylindrical body of the module, and the accumulator typically incorporates a nitrogen filled bladder thereby to maintain a suitable minimum pressure in the hydraulic system.

Hydraulic fluid supply and return pipes 46 are connected to the manifold 42 and extend rearwardly through the rear end cap 48 of the module body. The hydraulic supply and return pipes 46 terminate in suitable elbow connectors 50 to which the aforementioned flexible, helically shaped hydraulic supply and return lines 22 are connected.

The front end portion of the hydraulic power module 14 is supported by an annular cup-shaped seal 52 which is clamped to the front end cap of the module body by means of plate 53 and associated threaded fasteners. The outer perimeter of the cup-shaped seal includes a peripheral flange which engages the interior wall of the pipeline. Seal 52 is made of a tough long-wearing polyurethane elastomer.

An electrical terminal block 54 is mounted to the body of module 14 at the frontal and thereof by means of a suitable nipple arrangement which is arranged in sealed engagement with the front end cap of the module. The electrical connection provides the required supply of power to the drive motor 32 as well as control signals to the solenoid valves disposed in manifold 42 as will be hereinafter described. The terminal block 54 is connected to a length of flexible cable 56 which in turn is attached to a similar terminal block 58 (see FIG. 1) secured to the rear end cap of the body of the control module 16.

The control module 16 is not illustrated in detail but essentially it comprises a main battery, a backup battery, a drive motor relay, a pressure switch circuit board and a remote control switch all encased in a sealed cylindrical body. Under normal operating conditions the main battery package, which may comprise twenty nickel cadmium batteries, provides twenty-four volts of DC power for the drive motor and solenoid valve and twelve volts for the electronic controls. In the event of main battery failure, a back-up battery. (which may be a twenty-four volt 2.6 amp hour Gell cell) will be used to open the solenoid valve and operate the motor and controls. The remote, control switch (not shown) which controls the motor and solenoid valve is preferably of a type which may be activated by introducing a radioactive source near to it, a technique which is, in itself, known in the art.

As with the hydraulic power module, the front end of the control module 16 is provided with an annular seal 60 which is constructed and performs the same function as the previously described seal 52.

With reference now to FIGS. 2 and 4-8, the construction and operation of the gripping and sealing module 12 will now be described.

Both the front and rear ends of the gripping and sealing module are provided with annular cup-shaped flanges 64, 66 which serve to slidably support the module 12 for movement along the pipeline interior while at the same time sealingly engaging the pipeline wall so that the packer may be moved along the pipeline by a flow of fluid therein. The main body of module 12 comprises a pair of relatively axially movable portions. The rear body portion 68 defines a cylinder 70 within which a piston 72 is slidably mounted. Piston 72 is rigidly connected to the frontal body portion 74 by means of an elongated piston rod 76. The front end of piston rod 76 extends through and is firmly and sealingly connected with front end cap 78 forming a part of the frontal body portion 74. Piston rod 76 extends slidably through the front end cap 80 of rear body portion 68, suitable annular seals being provided to prevent leakage of hydraulic fluid therebetween. The piston 72 is accurately seated on a reduced diameter portion of the piston rod and is stabilized by means of opposed washers 82, the latter being firmly clamped against opposing recessed faces of the piston by means of an annular step on piston rod 76 and a further annular step provided on piston rod extension 76a, the latter being threaded onto the outer end of piston rod 76. Piston rod extension 76a extends slidably through the rear end cap 86 of the rear body portion 68. Suitable annular seals and packings 88 prevent leakage or by-pass of hydraulic fluids. In order to protect the piston rod extension 76a, a generally cylindrical protector 90 of elastomeric material projects rearwardly from end cap 86 with its hollow interior in coaxial alignment with piston rod 76. This protecter is held in place by clamp ring 92 which also serves to secure the rear annular seal 64.

Figure 2:
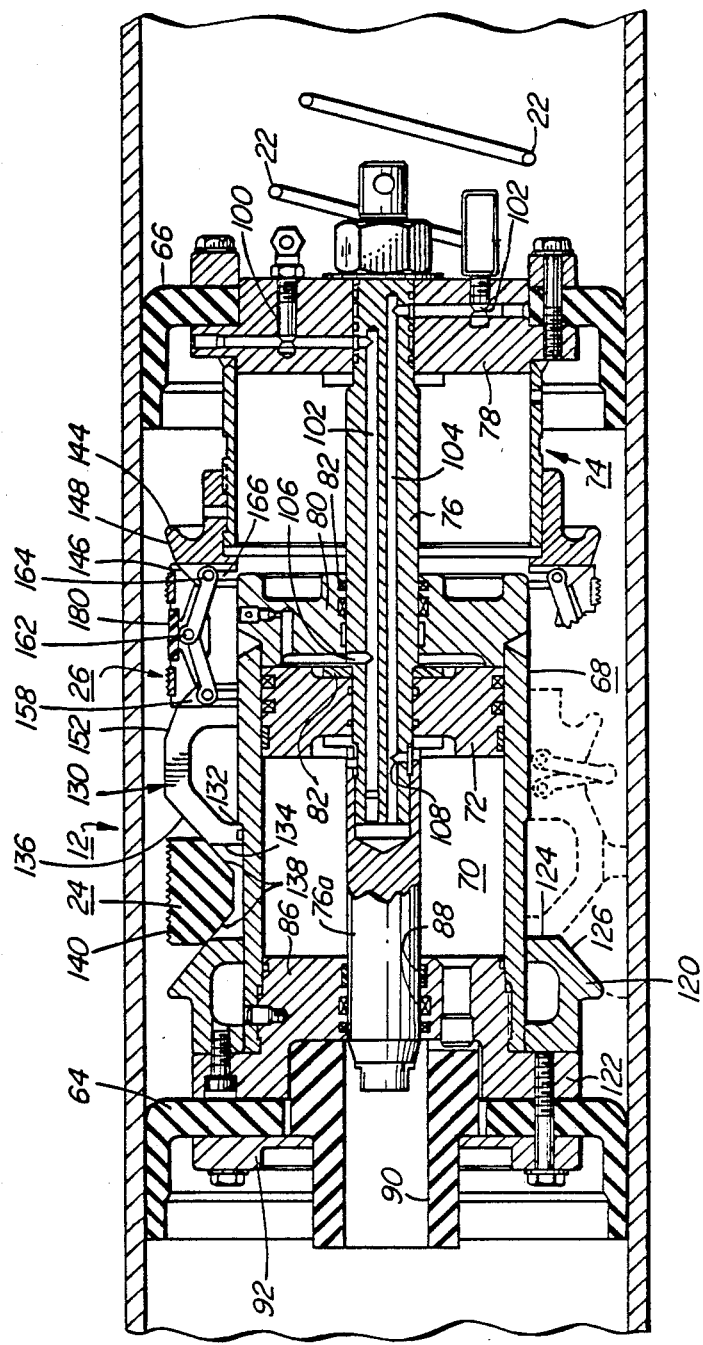
FIG. 2 is a longitudinal section view of the gripping and sealing modular portion of the packer.

It will readily be seen from FIG. 2 that the piston 72, the piston rod means and the cylinder 70 define two fully enclosed chambers such that as the front and rear body portions 74, 68 move relative to one another, the sum total of the chamber volumes remains substantially constant. Fluid passage means are provided for admitting or releasing pressurized fluid to or from either one of these enclosed chambers to effect the relative motion between the front and rear body portions. In order to effect this, the front end cap 78 is drilled and tapped to provide hydraulic fluid passages 100, 102, the same being connected to suitable hydraulic line fittings which, in turn, are connected to the previously noted hydraulic fluid supply and return pipelines 22 which extend between the hydraulic power module 14 and the gripping and sealing module 12. The hydraulic fluid passage 100 communicates with a longitudinally extending hydraulic oil passage 102 extending longitudinally of piston rod 76 while the other hydraulic fluid passage 102 communicates with a further passage 104 extending longitudinally of piston rod 76 in parallelism to passage 102. Passage 102 communicates with a short transverse passage 106 disposed closely adjacent the frontal face of piston 72 while the other longitudinal passage 104 communicates with a short transverse passage 108 arranged closely adjacent the rear face of piston 72. Hence, if it is desired to cause rear body portion 68 to move relatively toward frontal body portion 74, hydraulic fluid is supplied via passages 100, 102 and 106 thereby to increase the volume of the chamber defined at the front end of the piston 72 while at the same time hydraulic fluid disposed in the chamber rearwardly of piston 72 exits such chamber via passages 108, 104 and 102. The low pressure side of the piston and cylinder assembly thus acts as a reservoir for hydraulic fluid thus eliminating the need for a separate hydraulic chamber and substantially conserving space.

In order to activate previously noted sealing ring 24 and the brake shoes 26 to effect their sealing and gripping functions respectively, the sealing and gripping module 12 is provided with a series of annular wedging rings. These wedging rings comprise a rear wedging ring 120 disposed adjacent the aft end of rear body portion in close juxtaposition and secured to an outwardly extending flange portion 122 of rear end cap 86. Annular wedge ring 120 includes a frontal radial wall 124 and an annular wedging surface 126 which, in the embodiment shown, has a ramp angle which is about 45° relative to the longitudinal axis of the module, i.e. the axis of the piston rod. Also provided is an intermediate wedging ring 130, the same being slidably mounted on the exterior surface of the cylindrical rear body portion 68. As illustrated by the full and phantom lines in FIG. 2, this wedging ring can move from the full line forwardly disposed position wherein it engages against annular step 132 formed on rear body portion 68 to a relatively rearward position wherein its radial wall 134 is in close juxtaposition to the front radial wall 124 of the rear wedging ring 120. As with the rear wedge ring, the intermediate wedge ring includes an annular wedging surface 136, the same also having a ramp angle of about 45°.

The previously noted sealing ring 24 is located between the rear and intermediate wedge rings 120 and 130 and as again shown in FIG. 2, the sealing ring is itself provided with wedging surfaces 138 sloped to correspond with wedging surfaces 126 and 136 and in close engagement therewith such that as the intermediate wedging ring 130 moves relatively toward the rear wedge ring 120, the interaction of the several wedging surfaces causes the sealing ring 24 to be expanded radially outwardly such that the outer surface 140 of sealing ring 24 comes into close sealing engagement with the interior of the pipeline wall. This surface 140 is preferably provided with a series of narrow V-shaped grooves thereby to enhance the sealing effect. The sealing ring 24 is preferably made of a tough polyurethane elastomer having a Durometer hardness of approximately 85.

The structure for activating the brake shoes 26 will now be described. It will again be seen from FIG. 2 that a frontal wedging ring 144 is firmly secured and mounted to the rearward end of frontal body portion 74. Wedging ring 144 is provided with a pair of wedging surfaces, the radially inner wedging surface 146 having, in the embodiment shown, a ramp angle of approximately 45° with respect to the longitudinal axis, while the radially outer wedging surface 148 has a ramp angle of about 20° with respect to the longitudinal axis. The frontal portion of the intermediate wedging ring 130 is also provided, in like manner, with radially inner and radially outer wedging surfaces 150 and 152 respectively, having ramp angles relative to the longitudinal axis of 45° and 20° respectively.

Figure 5:
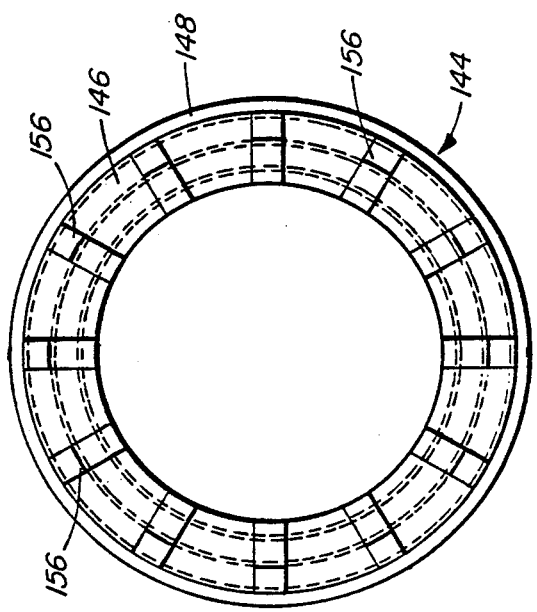
FIG. 5 is a further view of the brake shoe activating ring looking in the axial direction.
Figure 4:
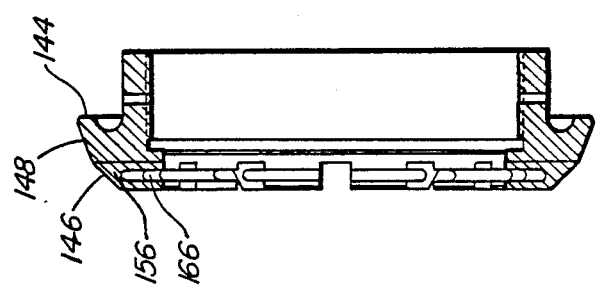
FIG. 4 is a section view of one of the dual ramp brake shoe activating rings.

The front wedging ring 144 is shown in further detail in FIGS. 4 and 5. In addition to the radially inner and outer wedging surfaces 146,148, the rearwardly directed face of the wedging ring is provided with a series of circumferentially spaced radially disposed slots 156. Although not shown in the drawings, the forwardly directed portion of the intermediate wedging ring 130 is very similar in appearance to the structure shown in FIG. 5. The intermediate wedging ring is also provided with corresponding radial slots 158. These radial slots 156 and 158 receive the outer ends of respective links 160, each pair of links 160 being pivotally connected to a respective one of the brake shoes 26 via a centrally located pivot pin 162. The outer ends of links 160 are provided with relatively short dowel pins 164, which dowel pins 164 project into and are constrained for movement within relatively short radially arranged slots 166 formed in the opposing sidewalls of the previously noted radial grooves 156.

Figure 7:
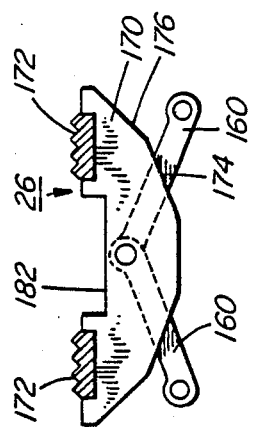
FIG. 7 is a view, taken in a radial plane, of one of the brake shoes.
Figure 6:
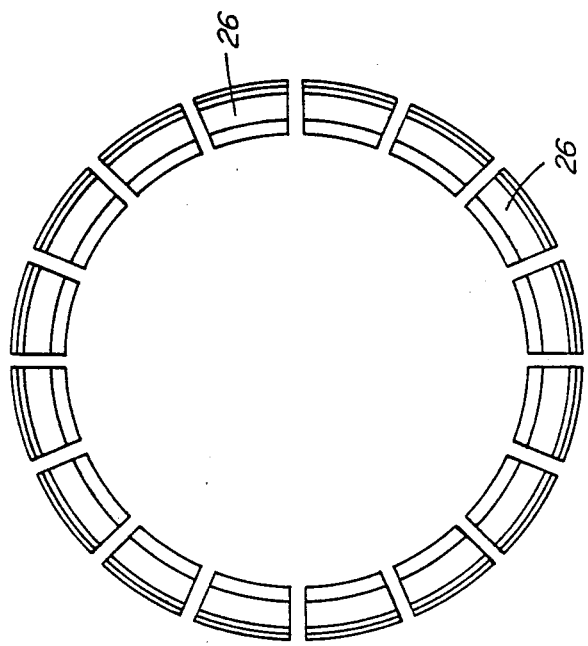
FIG. 6 is a view in the axial direction of the brake shoe array.

The brake shoes themselves are illustrated in FIGS. 6 and 7. As shown in FIG. 6, the brake shoes are disposed in circumferentially spaced apart relationship, such spaced apart circumferential locations being maintained by virtue of the previously noted pairs of links 160. Each brake shoe 126 comprises a rigid metal backing portion 170 of a suitable structural material, such as steel. The radially outer faces of the brake shoes 126 are provided with annular recesses receiving inserts 172. These inserts are made of a metal which is sufficiently soft or malleable as to allow high pressure to be exerted between the brake shoes and the pipeline interior wall without danger of scoring the interior wall. Hence, the metal inserts must be made of a material having a hardness less than the hardness of the pipeline steel and for this purpose it is desirable to select aluminum having a hardness of about 65 to about 90 HBU (Brinell hardness units). These inserts may be secured to the steel backing portion by a suitable bonding agent such as an epoxy resin. The outer facing surfaces of inserts 172 are preferably provided with a series of V-shaped ridges or ribs to assist in providing high specific contact pressures. After several uses, these V-shaped ribs will become somewhat flattened out at which time the brake shoe assembly may be partially dismantled and new inserts put into place.

The radially inner surfaces of brake shoes 26 are also provided with wedging surfaces designed to co-operate with the radially inner and outer wedging surfaces of the front and intermediate wedging rings 44 and 13 respectively. Accordingly, as best seen in FIG. 7, each brake shoe is provided with radially inner and outer wedging surfaces 174, 176 having ramp angles of 20° and 45° respectively relative to the longitudinal axis of the module. By virtue of the dual ramp angle arrangement, during initial movement of the intermediate and front wedging rings toward each other, the 45° angle wedging surfaces are in contact with each other with the result being that the brake shoes move rapidly outwardly to positions in fairly close juxtaposition to the interior wall of the pipeline. At this point the 20° angle wedging surfaces come into contact with each other such that the degree of radial outward movement of the brake shoes per unit of axial movement of wedging rings relative to one another is substantially reduced. The dual ramp angles thus provide the desired mechanical wedging advantage as the brake shoes come into griping engagement with the pipeline wall while minimizing the overall mount of relative axial movement required between the wedging surfaces as to provide the desired total amount of radial motion of the brake shoes. By keeping the required amount of axial travel down to a minimum, the overall structure may be made somewhat shorter.

In order to firmly position the brake shoes 26 on the front and intermediate wedging rings 144, 130, an annular band 180 of suitable elastomeric material, such as urethane, extends completely around the brake shoe assembly, such band being disposed in a wide shallow groove 182 provided in each brake shoe as best illustrated in FIGS. 2 and 7.

It will be noted that as the front and rear body portions of the module 12 advance axially towards each other, that the intermediate wedging ring 130 will begin to travel axially along the cylindrical wall of the rear body portion. (It might be noted at this point that suitable O-ring seals between the intermediate wedging ring and the cylindrical surfaces prevent any leakage of fluids therebetween.) As the brake shoes 26 come into engagement with the pipeline interior wall, the reaction forces are such that as the rear body portion 68 continues to advance axially toward and into the frontal body portion 74, such rear body portion also will move axially relative to the intermediate wedging ring such that the rear wedging ring comes closer to the intermediate wedging ring thus forcing the sealing ring 24 outwardly in the radial direction. This process continues until the radial wall 124 of the rear wedging ring 120 comes into contact with the rearward radial wall 134 of the intermediate wedging ring at which point no further relative movement between these wedging rings can take place. At this point, the sealing ring is fully compressed against the pipeline interior wall and is capable of developing the required sealing pressure. Continued axial movement of the rear body portion relative to the frontal body portion causes the brake shoes 26 to be urged radially outwardly thereby to develop the required degree of gripping force. The degree of force can of course be adjusted by making suitable changes to the hydraulic supply and control system, which system will now be described.

Figure 8:
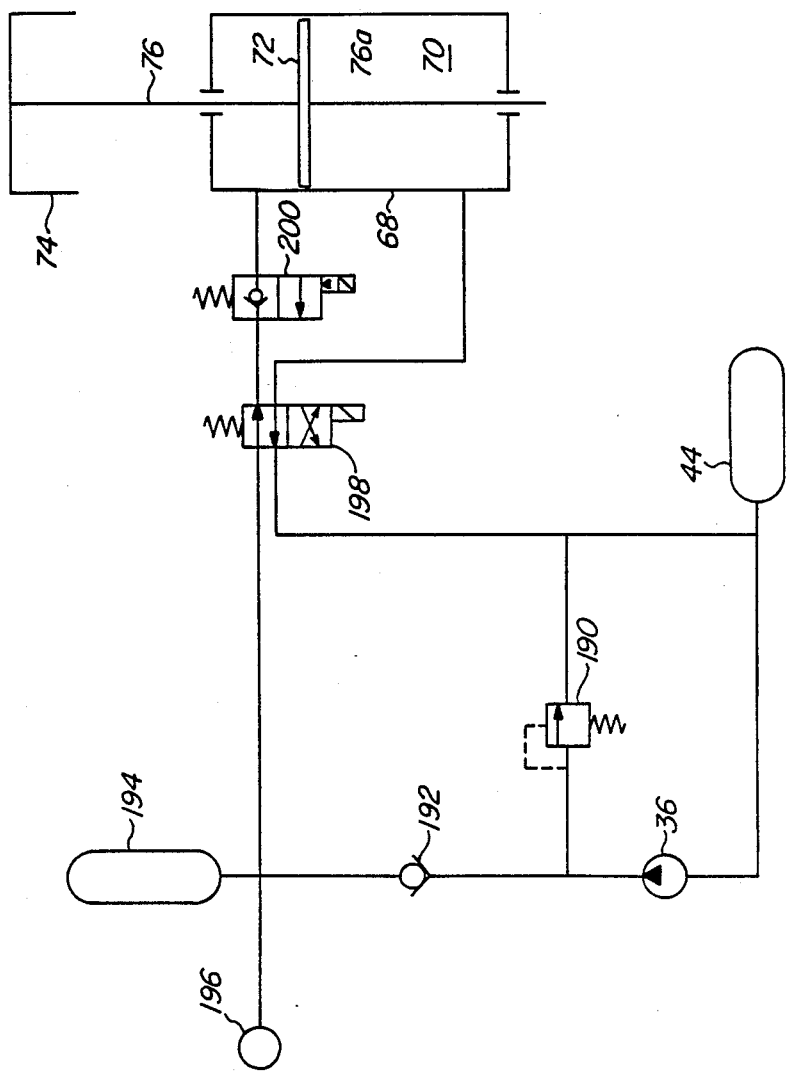
FIG. 8 is a schematic diagram of the hydraulic supply and control system.

Referring now to FIG. 8, the hydraulic system is illustrated in schematic fashion. The rear and front body portions 68, 74 of the module are illustrated together with piston rod 76, piston 72 and piston rod extension 76a. Hydraulic pressure for the system is developed by the previously noted hydraulic piston pump 36. An overpressure condition is avoided by providing a relief valve 190 in the system. The output side of pump 36 is connected through a one-way check valve 192 and the high pressure side of the pump also includes a high pressure accumulator 194 to accommodate for small changes in fluid volume. A suitable commercially available pressure activated switch 196 is also connected in the high pressure side of the system. The pressure in the high pressure accumulator can be set at a fairly high level, e.g. about 200 pounds per square inch. The high pressure line is connected to the ports of a solenoid valve 198 and thence through a normally closed solenoid valve 200. This line then enters into the high pressure side of the cylinder 70. The low pressure side of this same chamber is connected through the previously noted solenoid valve 198, to the low pressure accumulator 144 and to the inlet of pump 36.

During operation, pump 36 and solenoid valve 200 are activated by a remote control switch (not shown) when it is desired to initiate the gripping and sealing action. Pressurized hydraulic fluid flows through check valve 192 through solenoid valve 198 and through the one-way check valve of the normally closed solenoid valve 200 and into the high pressure side of the cylinder 70 thence causing the piston 72 to be moved and causing relative axial movement of module portions 68 and 74 toward one another. This initiates the gripping and sealing action described previously. The high pressure side of the cylinder 70 is pressurized to a pre-set limit established by the pressure switch 196. When this limit has been reached, the pump 36 is turned off and when the opposite action is to take effect, the remote control switch opens the solenoid valve 200, activates pump 36 and reverses the solenoid valve 198 so that hydraulic fluid can drain from the high pressure side of cylinder 70 while at the same time hydraulic fluid is pumped into the low pressure side of the cylinder thereby to positively effect movement of the piston 72 and hence move the front and rear body portions of the module 12 away from one another. This action continues until the piston 72 reaches the end of its path of travel with a pressure build-up occurring in the opposite side of the piston sufficient as to trigger the pressure switch 196 which then turns off pump 36 as well as solenoid valves 198 and 200.

The configuration described above has been found to seal and grip effectively under extremely high pressures. In the embodiment as illustrated, and arranged to operate in a ten inch diameter pipeline, line pressures of up to 1300 psi have been successfully withstood. At the same time, damage to the interior wall of the pipeline was avoided. The use of the aluminum inserts as described with ribbed contact faces ensure high specific gripping pressure and at the same time the ribbing allows the aluminum to penetrate any wax build-up and to solidly contact the inside of the pipe wall. The polyurethane sealing 24 ring is also ribbed for the same reason as described previously.

It should also be noted that the sealing ring 24 is located on the high pressure side of the brake shoes 26 with these shoes tending to act somewhat as an anti-extrusion barrier. In earlier tests with the seal ring installed on the opposite or low pressure side of the brake shoes, extrusion of the sealing ring occurred at a much lower pressure. As noted above, the particular arrangement described of seal rings, wedging rings, brake shoes etc. has withstood pipeline test pressures of 1300 psi without leakage. Therefore, the holding force developed by the brake shoes 26 can be said to define the upper limit of the operating pressure. It should also be noted that when the seal ring 24 and brake shoes 26 are in their sealing and pipe wall gripping positions respectively, the pipeline pressure on the end of the packer is effectively transmitted through the sets of wedging rings and thus converted into radial expansion forces which are transmitted through the brake shoes thus supplementing the pressures exerted by the hydraulic system and increasing the available braking force.

A preferred embodiment of the invention has been described in detail herein for purposes of illustration. It should be apparent to those skilled in the art that the invention is not limited to the precise details of construction set forth herein but is susceptible to various changes and modifications without departing from the spirit of the invention.

I claim:
1. A fluid propelled pipeline packer for plugging a pipeline at a selected location therein and comprising:
   (a) a main body adapted for propulsion through the pipeline in an axial direction;
   (b) a brake shoe support assembly on said main body;
   (c) a plurality of circumferentially spaced brake shoes capable of gripping the interior wall of the pipeline mounted to said brake shoe support assembly;
   (d) fluid pressure activated means associated with said brake shoe support assembly and together therewith capable of urging said brake shoes radially outwardly into gripping engagement with said pipeline to secure said main body in a desired location in said pipeline against the pipeline pressure forces acting thereon;
   (e) a pair of annular wedging means mounted to said main body for axial movement toward each other as said fluid pressure activated means acts on said brake shoe support assembly to urge said brake shoes into said gripping engagement;
   (f) an annular sealing member of elastomeric material mounted to said main body member between said annular wedging means and cooperating therewith to expand radially outwardly as said annular wedging means move toward each other to come into sealing engagement with the interior wall of the pipeline to substantially prevent leakage of pipeline fluid around said main body member;
   (g) fluid pressure supply and control means connected to said fluid pressure activated means and adapted to, on command, cause said brake shoes to be urged into gripping relation with the pipeline and to effect said movement between said annular wedging means to expand said annular sealing member into sealing engagement with the pipeline wall;
   (h) said fluid pressure activated means comprising a cylinder and a piston and piston rod means slidable within said cylinder and defining therewith a pair of fully enclosed chambers which are operatively connected to said fluid pressure supply and control means for supplying fluid to either one of said chambers as fluid is released from the other of said chambers to effect movement of said piston and piston rod means relative to said cylinder; said cylinder, piston and piston rod means being located in the main body of the packer and being operatively connected to said brake shoe support assembly and to said annular wedging means such that as said piston and piston rod means move relative to said cylinder in one direction said brake shoes are urged into said gripping engagement and said annular sealing member is expanded radially outwardly into said sealing engagement and when said piston and piston rod means move relative to said cylinder in the other direction said brake shoes are released from said gripping engagement and said annular sealing member is permitted to contract radially inwardly out of said sealing engagement, and wherein said piston, piston rod means and cylinder are arranged such that the sum total of the volumes of said pair of fully enclosed chambers remains substantially constant as the piston and piston rod means move relative to said cylinder; said fluid pressure supply means including passage means arranged for admitting or releasing said fluid to or from said enclosed chambers and such that as one of said enclosed chambers is made to increase or decrease in volume, the other said chamber undergoes a corresponding decrease or increase, respectively, in volume and acts as a reservoir for the fluid.

2. The pipeline packer of claim 1 wherein in use, one end of said packer is located at an upstream high pressure location and wherein said annular sealing member is located adjacent an upstream high pressure side of said brake shoes and said brake shoe support assembly, and said annular wedging means being arranged such that said annular sealing member is in close proximity to said brake shoes when in the sealing and gripping positions respectively so that said brake shoes help support the annular sealing member against fluid pressure forces and assist in preventing distortion and extrusion thereof.

3. The pipeline packer of claim 1 wherein said main body includes separate portions which are relatively axially movable in response to activation of said fluid pressure activated means, both said annular wedging means and said brake shoe support assembly being mounted on said main body portions for relative axial movement with respect to each other.

4. The pipeline packer of claim 3 wherein said brake shoe support assembly includes relatively movable annular parts defining opposed annular wedging surfaces adapted to move axially relative to one another as said separate portions of said main body move relative to one another, which wedging surfaces engage with said brake shoes to effect radial movement thereof in response to said relative axial movement.

5. The pipeline packer of claim 4 wherein said annular wedging means and said brake shoe support assembly together comprise a pair of end rings and an intermediate ring, said end rings being secured to respective said separate portions of said main body, and said intermediate ring being mounted for free axial movement along said main body, said annular wedging means being defined on a first of said end rings and a portion of the intermediate ring while said annular wedging surfaces are defined on a further portion of said intermediate ring and the second end ring whereby as said rings move axially toward or away from one another both said annular sealing member and said brake shoes move radially outwardly or inwardly respectively.

6. The pipeline packer of claim 4 wherein said annular wedging surfaces which support said brake shoes have plural slopes thereon arranged so that the mechanical wedging advantage increases as the brake shoes come toward the interior wall of the pipeline.

7. The pipeline packer of claim 6 further including linkage means connected between each said brake shoe and said relatively movable annular parts of said brake shoe support assembly whereby to provide positive radial inward motion of said brake shoes.

8. The pipeline packer of claim 1 wherein said fluid pressure supply means includes passage means extending longitudinally of said piston rod means and communicating with said chambers to admit and release fluid thereto and therefrom.

9. A fluid propelled pipeline packer for plugging a pipeline at a selected location therein and comprising:
(a) a main body adapted for propulsion through the pipeline in an axial direction;
(b) brake means mounted on said main body to releasably fix the main body at a selected location along the pipeline;
(c) fluid pressure activated brake actuator means on said main body operatively connected to said brake means;
(d) said brake actuator means including a piston and a piston rod means movable within a cylinder means located in said main body;
(e) said piston and piston rod means together with said cylinder means defining two fully enclosed chambers, said piston rod means arranged such that as the piston and piston rod means move relative to said cylinder means the sum total of the volumes of said two fully enclosed chambers remains substantially constant;
(f) fluid passage means communicating with both of said enclosed chambers, for admitting or releasing brake activating fluid to or from one of said enclosed chambers to effect said relative motion in a direction such as to activate or deactivate the brake means and fix or release said main body to the pipeline while at the same time said fluid is released or admitted from or to the other said chamber whereby, as one of said enclosed chambers is made to increase or decrease in volume the other said chamber undergoes a corresponding decrease or increase respectively in volume and acts as a reservoir for the activating fluid.

10. The pipeline packer of claim 9 wherein said main body includes a pair of relatively axially movable portions, one said portion being connected to the piston rod means and the other said portion being connected to the cylinder means, and said brake means comprising radially movable shoes and cooperating wedging surface means responsive to relative axial motion between said portions of said main body to effect radial motion of said shoes between pipeline interior gripping and non-gripping positions.

11. The pipeline packer of claim 10 wherein said cooperating wedging surface means and said radially movable shoes are mounted to said relatively axially movable portions, and said fluid passage means being located in said piston rod means and extending longitudinally thereof and communicating with said enclosed chambers via respective further passages located adjacent respective opposing faces of said piston.

12. The pipeline packer of claim 11 further including pump means and solenoid valve means connected to said fluid passage means for supplying the pressurized fluid to one or other of said enclosed chambers and pressure control valve means to control the maximum supply pressure.

13. The pipeline packer of claim 9 further including pump means and solenoid valve means connected to said fluid passage means for supplying the pressurized fluid to one or other of said enclosed chambers and pressure control valve means to control the maximum supply pressure.

14. A fluid propelled pipeline packer for plugging a pipeline at a selected location therein and comprising:
   (a) a main body adapted for propulsion through the pipeline;
   (b) a brake shoe support assembly on said main body;
   (c) a plurality of circumferentially spaced brake shoes capable of gripping the interior wall of the pipeline mounted to said brake shoe support assembly;
   (d) means associated with said brake shoe support assembly for urging said brake shoes into gripping engagement with said interior wall of the pipeline, said means including wedging surfaces on said brake shoe support assembly engaged with said brake shoes and relatively movable toward and away from one another to effect outward or inward radial movement of said brake shoes;
   (e) said wedging surfaces having plural slopes thereon such that during a first portion of said relative motion of said wedging surfaces toward each other said brake shoes are moved radially outwardly by a selected distance and during a second equal portion of said relative motion said brake shoes are moved radially outwardly into engagement with said interior pipeline wall by substantially less than said selected distance to thus provide a desired mechanical wedging advantage as said shoes come into gripping engagement with the pipeline wall while minimizing the overall amount of relative motion required between said wedging surfaces to provide the total amount of radial motion of the brake shoes.

15. The pipeline packer of claim 14 wherein means are provided for supporting said main body for movement in an axial direction through the pipeline, said wedging surfaces being relatively movable toward and away from one another in the axial direction, and hydraulic means for effecting said relative movement.

16. The pipeline packer of claim 15 wherein said brake shoe support assembly comprises annular members mounted to said main body and having said wedging surfaces defined thereon.

17. The pipeline packer of claim 16 further including linkage means connected between each said brake shoe and said annular members for positively retracting said brake shoes when said members are moved axially away from each other.

18. A fluid propelled pipeline packer for plugging a pipeline at a selected location therein and comprising:
   (a) a main body adapted for propulsion through the pipeline;
   (b) a brake shoe support assembly on said main body;
   (c) a plurality of circumferentially spaced brake shoes capable of gripping the interior wall of the pipeline mounted to said brake shoe support assembly;
   (d) means associated with said brake shoe support assembly for urging said brake shoes into gripping engagement with said interior wall of the pipeline;
   (e) each said brake shoe including a rigid metal backing and a metal facing fixed thereto for engaging said pipeline interior wall, said metal facing being sufficiently soft or malleable as to allow a substantial pressure to be exerted between the brake shoes and the pipeline interior wall without causing scoring of said interior wall.

19. The pipeline packer of claim 18 wherein said metal facing comprises a non-ferrous metal or alloy.

20. The pipeline packer of claim 19 wherein said metal facing comprises aluminium having a hardness of about 65 to about 90 H.B.U.

21. The pipeline packer of claim 18, wherein said metal facing has narrow ribs thereon to assist in providing high pipeline contact pressure.

22. The pipeline packer of claim 18, wherein the brake shoe metal backing is of steel and said metal facing is bonded thereto.

23. The pipeline packer of claim 14 wherein said wedging surfaces and the slopes thereof are arranged such that the mechanical wedging advantage becomes greater as said brake shoes move toward said interior pipeline wall.

* * * * *